United States Patent [19]
Wright

[11] 3,954,614
[45] May 4, 1976

[54] SERUM SKIMMER AND FILTER SEPARATION UNIT

[75] Inventor: Hershel Earl Wright, Decatur, Ill.

[73] Assignee: Glasrock Products, Inc., Atlanta, Ga.

[22] Filed: Dec. 4, 1973

[21] Appl. No.: 421,517

Related U.S. Application Data

[63] Continuation-in-part of Ser. No. 276,782, July 31, 1972, abandoned.

[52] U.S. Cl............................ 210/136; 210/359; 210/DIG. 23
[51] Int. Cl.²................................ B01D 35/02
[58] Field of Search .... 210/359, 446, 136, DIG. 23; 23/258.5; 137/512.4; 128/2 F, 272

[56] References Cited
UNITED STATES PATENTS

| | | | |
|---|---|---|---|
| 3,661,265 | 5/1972 | Greenspan.................. | 210/446 X |
| 3,664,774 | 5/1972 | Tupper et al. ................. | 417/560 |
| 3,693,804 | 9/1972 | Grover........................... | 210/359 |
| 3,779,383 | 12/1973 | Ayres............................ | 210/84 |
| 3,814,248 | 6/1974 | Lawhead........................ | 210/83 |
| 3,832,141 | 8/1974 | Haldopoulos................. | 210/359 X |
| 3,846,077 | 11/1974 | Ohringer........................ | 210/359 X |

Primary Examiner—Frank A. Spear, Jr.
Attorney, Agent, or Firm—Lane, Aitken, Dunner & Ziems

[57] ABSTRACT

A plunger assembly is longitudinally movable within an outer tube having a lower closed end. The plunger assembly includes a plunger tube and a resilient piston-valve plug seated in the inner end thereof. The piston-valve plug has frictional sealing engagement with the inner walls of the outer tube, has a slit therethrough for permitting the flow of clear liquid from the lower end of the outer tube into the plunger tube when the plunger tube is moved inwardly of the outer tube, and has a port therethrough for permitting the return flow of air into the space in the outer tube below the plug when the plunger tube is moved outwardly of the outer tube. A filter element is seated in the plug to filter liquid prior to flow through the slit.

7 Claims, 13 Drawing Figures

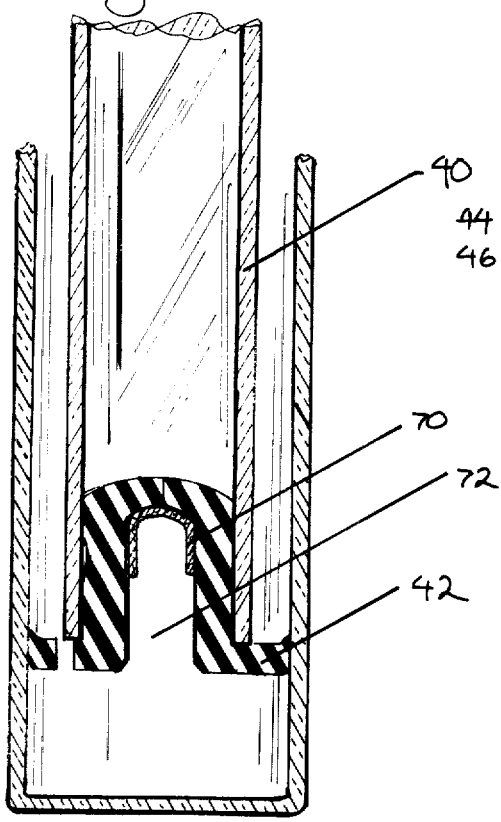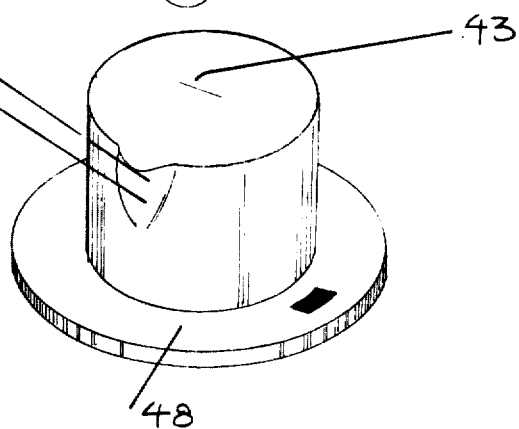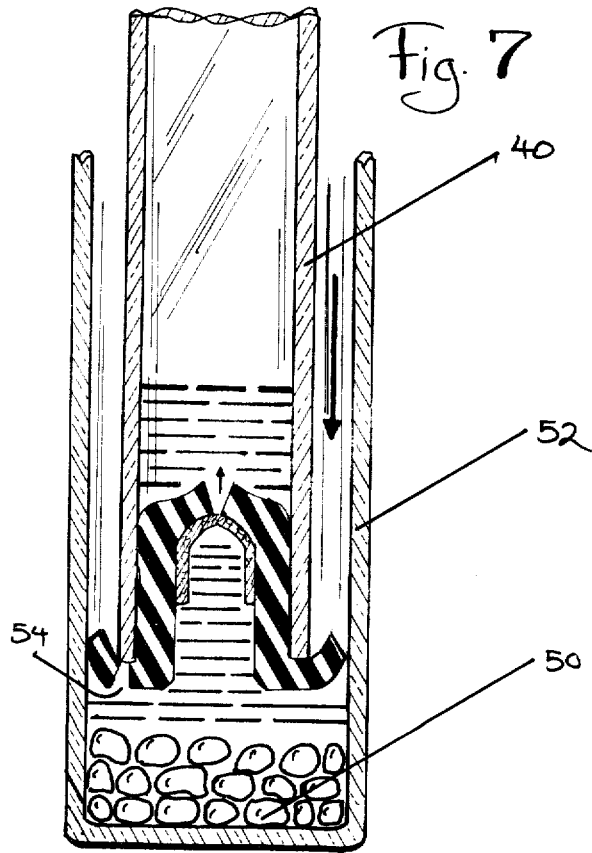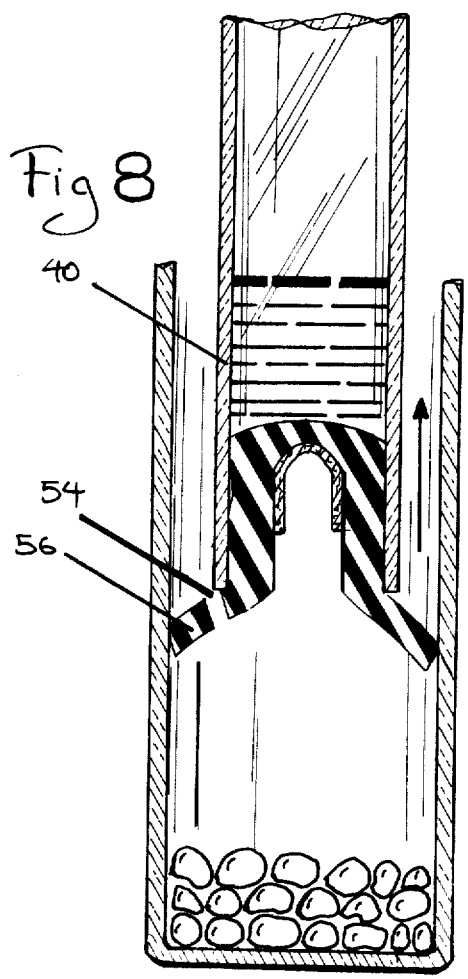

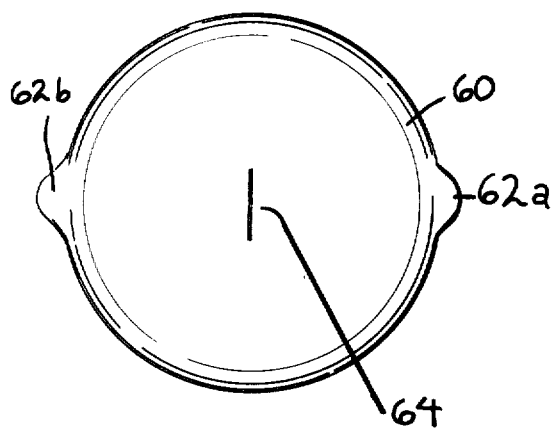
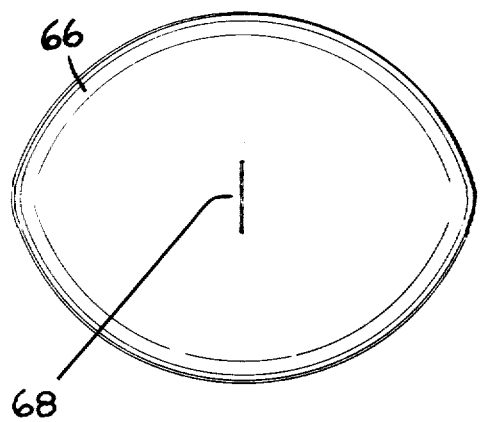
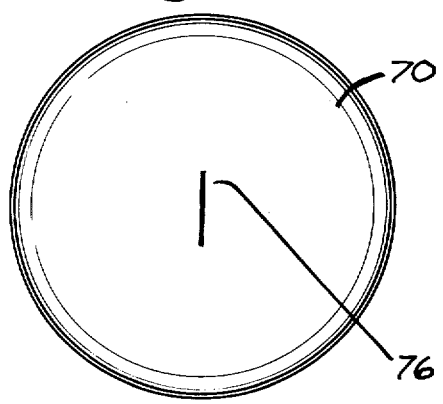
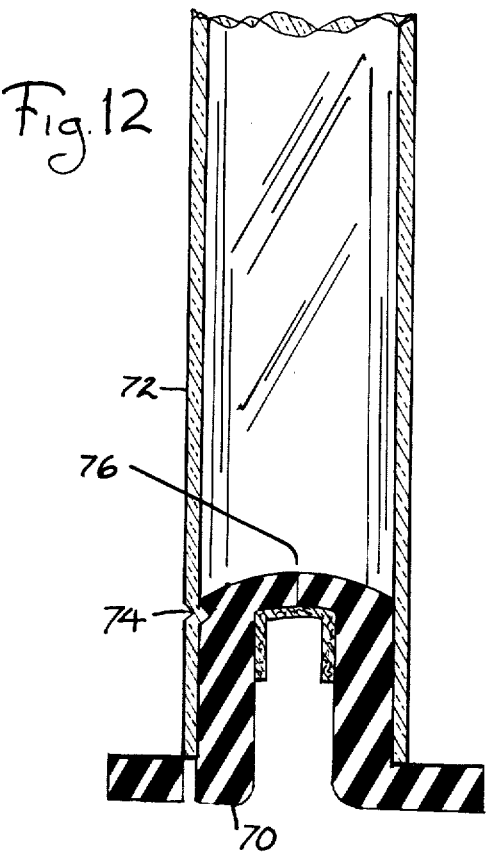
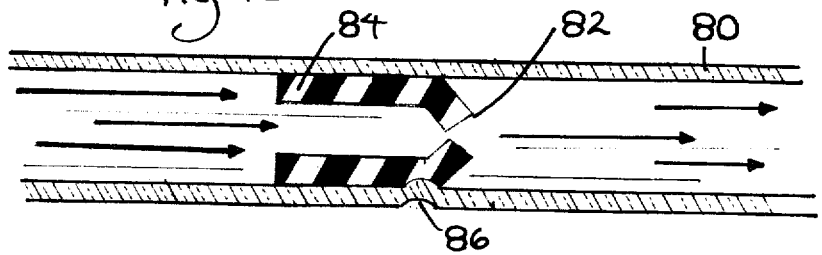

SERUM SKIMMER AND FILTER SEPARATION UNIT

FIELD OF THE INVENTION

This application is a continuation in part of application Serial Number 276,782 filed July 31, 1972, now abandoned.

The present invention relates generally to apparatus for separating a clear liquid from settled-out immiscible liquids and/or settled-out solids, and more particularly to apparatus for skimming and filter separation of blood serum from settled-out cells. A special feature of the present invention is the use of a unique one-way fluid valve which has broad application.

Summary of the Invention

The apparatus of the present invention serves to skim and filter separate serum or other liquid from solids or the like which ave been settled to the lower end of a sample tube.

In accordance with the principles of the present invention, a novel plunger assembly, comprised of a plunger tube and a novel piston-valve plug at the lower end thereof, is arranged for longitudinal movement within the sample tube. The plug has a slit, with a filter element associated therewith for permitting the flow of liquid from the sample tube into the plunger tube when the latter is moved inwardly of the sample tube. The plug also has a port for permitting the return flow of air into the lower end of the sample tube when the plunger tube is moved outwardly of the sample tube.

The prior art discloses a number of separators useful for the separation of serum or other liquid from solids or the like. Separators take various form and some are quite complicated, requiring, for example, separate air returns to allow the withdrawal of the tube that contains the filter element. Other separators are shown which operate differently but which have features bearing some similarities to features employed in the present invention. Typical of some of the more recent separators disclosed in the prior art are those shown in U.S. Pat. Nos. 3,661,265; 3,481,477 and 3,512,940. U.S. Pat. No. 3,661,265 discloses an outer closed end tube and a serum separator tube which is designed to move into the outer tube to collect a sample through a filtering system incorporated in a plug assembly. The plug assembly shown in this patent has partially drilled holes with over-extending flaps to provide a one-way valve effect. Fastened to the lower portion of the plug below the valve is a disc used for filtering. The patent also refers to the possible use of a check valve along the edge of the plug assembly to facilitate the flow of air into the lower part of the collection tube when the serum separator tube is withdrawn, but no specific embodiment is shown or described.

Although a closed outer tube and the plunger tube are utilized in the present invention, the plug assembly differs significantly from the plug assembly shown in the above described patent. In fact, it is felt that the plug assembly is the most critical element in the smooth and efficient operation of the serum separator. In the embodiment shown, the valving system is simpler, the use of cement which may contaminate the sample is not required and an outer one-way port system is shown and described which operates effectively to seal itself during the downward stroke of the plunger tube and to facilitate the flow of air into the tube when the plunger tube is being withdrawn.

The devices shown in U.S. Pat. Nos. 3,481,477 and 3,512,940 also disclose systems whereby a plunger tube is inserted into an outer tube. However, these devices are considered to be somewhat more complex than the device shown in U.S. Pat. No. 3,661,265 as described above and different in several respects from the device of the present invention.

In summary, the described apparatus provides a simpler and more economical fine filtration and skimmer unit than heretofore available.

BRIEF DESCRIPTION OF THE DRAWINGS

FIG. 5 is a vertical sectional view of an alternate embodiment of the skimmer and filter separation unit of the present invention;

FIG. 6 is a perspective view of a plug assembly used in the skimmer and filter separation unit shown in FIG. 5;

FIG. 7 is a vertical sectional view of the skimmer and filter separation unit shown in FIG. 5 in one operative position;

FIG. 8 is a vertical sectional view of the skimmer and filter separation unit shown in FIG. 5 in a second operative position;

FIG. 9 is a plan view of an alternate plug assembly;

FIG. 10 is a second alternate embodiment of the plug assembly shown in FIG. 6;

FIG. 11 is a third alternate embodiment of the plug assembly shown in FIG. 6;

FIG. 12 is a vertical sectional view of a plunger tube incorporating the plug assembly shown in FIG. 11; and FIG. 13 is a horizontal section view of a tube and plug illustrating an alternate use of the plug as a one-way valve.

DESCRIPTION OF THE PREFERRED EMBODIMENT

Figure 1:
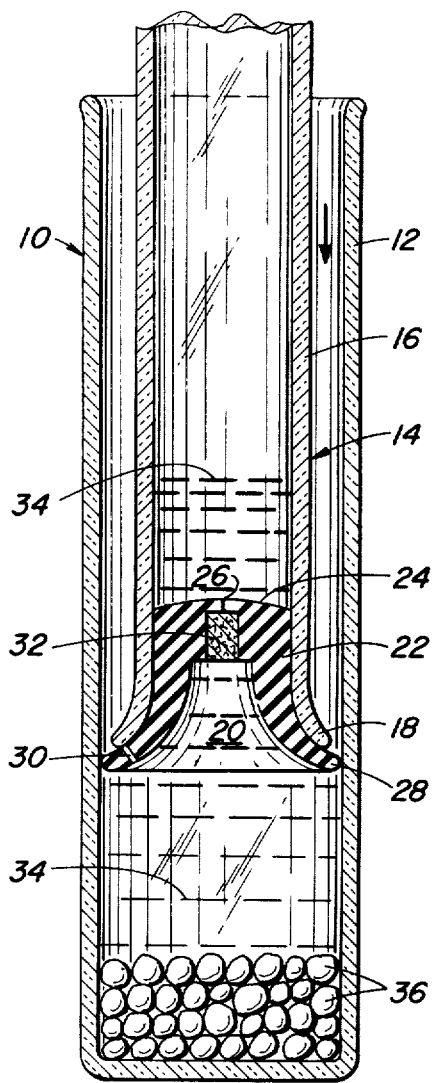
FIG. 1 is a vertical sectional view of the skimmer and filter separation unit of the present invention, and shows the parts in one operative position.
Figure 2:
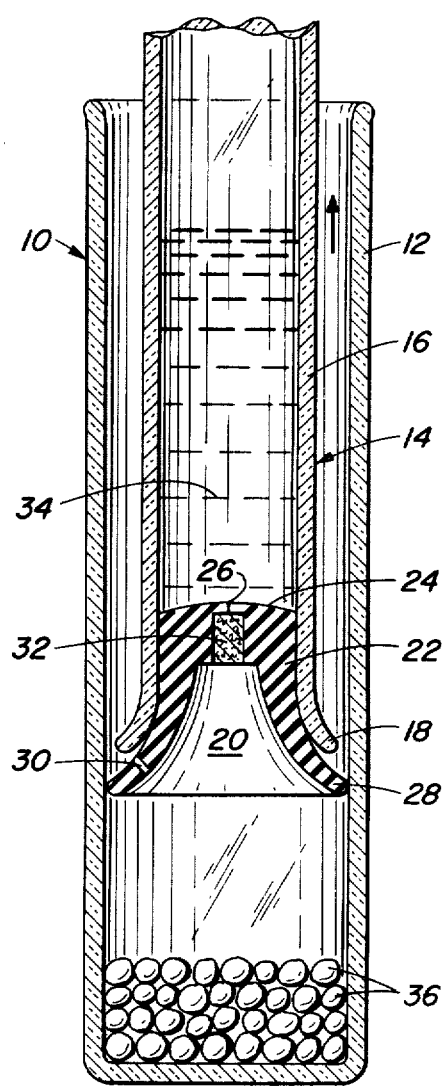
FIG. 2 is a vertical sectional view corresponding generally to FIG. 1, but shows the parts in a different operative position.

Referring now to FIGS. 1 and 2, there is indicated generally by the reference numeral 10 a combined skimmer and filter separation unit embodying the principles of the present invention.

The unit 10 comprises an outer tube 12 with a lower closed end, which may for example consist of an ordinary test tube, and a plunger assembly 14 longitudinally movable within the outer tube 12.

Figure 3:
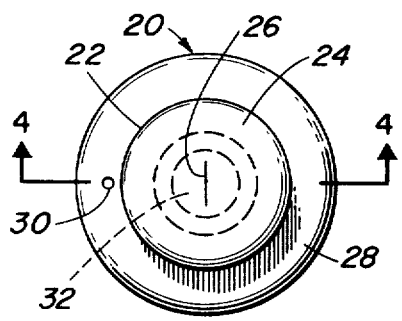
FIG. 3 is a plan view of the resilient piston-valve plug incorporated in the unit of FIGS. 1 and 2.
Figure 4:
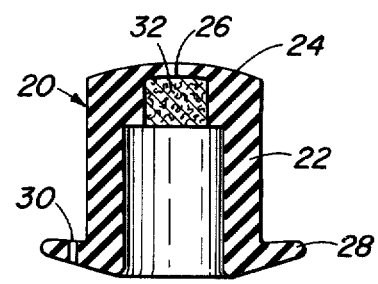
FIG. 4 is a sectional view, taken substantially along the line 4—4 in FIG. 3.

The plunger assembly 14 comprises a plunger tube 16, of acetate or the like, having an annular outwardly flared inner or lower end 18. Seated in the inner end of the plunger tube 16 is a piston-valve 20 formed of rubber of other suitable resilient material. As best shown in FIGS. 3 and 4, the plug 20 comprises a tubular body portion 22 which is seated in the inner end of the plunger tube 16, an upper head portion 24 having a slit 26 formed therethrough which serves as a one-way valve, and a lower annular flange portion 28 having valve means comprising in this instance a port 30 formed therethrough. Seated in the tubular body portion 22 of the plug 20, as shown in FIGS. 1 and 2, is a filter element 32 which may be a polyethylene filter, such as manufactured by Porex Materials Corp., Division of Glasrock Products, Inc. of Fairburn, Georgia, or a filter screen heat sealed in place or held in place by an O-ring.

In one model unit 10, for example, the inner diameter of the outer tube 12 was 0.530 inches, the outer diameter of the body of the plunger tube 16 was 0.390 inches, the diameter of the flared end 18 was 0.495 inches, and the diameter of the plug flange 28 is an unassembled unstressed condition was 0.580 inches.

To withdraw blood serum or other liquid 34 from settled-out cells or other solids 36 contained in the outer tube 12, the plunger assembly 14 is inserted in the tube 12. As the plunger assembly 14 is moved downwardly or inwardly of the outer tube 12, the outer periphery of the resilient plug flange 28 frictionally engages and forms an air-tight seal with the inner walls of the outer tube 12. Also, as shown in FIG. 1, the frictional contact of the resilient plug flange 28 against the inner walls of the outer tube 12 urges or biases the flange 28 into engagement with the outwardly flared lower end 18 of the plunger tube 16, thereby closing the plug port 30. During the initial movement of the plunger assembly 14, air above the serum 34 is released to the atmosphere through the plug slit 26. As the plug 20 moves into the serum 34, the serum is formed through the filter element 32 and the plug slit 26, and flows from the space in the outer tube 12 below the plug 20 into the space in the plunger tube 16 above the plug 20. In this manner, the serum 34 is filtered, skimmed, and collected in the plunger tube 16.

When the plug 20 reaches the sedimentation or solids 36 in the lower end of the outer tube 12, or the desired amount of serum 34 has been withdrawn, the plunger tube 16 is pulled or moved outwardly of the outer tube 12, as shown in FIG. 2. To accommodate this upward movement, the frictional contact of the plug flange 28 with the inner walls of the tube 12 effects disengagement between the flange 28 and the outwardly flared end 18 of the plunger tube 16, thereby allowing air to flow through the plug port 30 from the space in the outer tube 12 surrounding the plunger tube 16 above the plug 20 into the space in the outer tube 12 below the plug 20. After the plunger assembly 14 has been removed from the tube 12, the filter separated serum 34 in the plunger tube 16 is available for examination or other use.

FIG. 5 illustrates an alternate embodiment of the present invention wherein an unflared tube 40 is shown having a piston-valve plug 42 inserted in its lower end. Plug 42 is provided with a unique one-way valve system shown more clearly in FIG. 6, comprising a slit 43 and biasing means 44. The biasing means 44 shown in FIG. 6 consists of a projection 46 peripherally situated above the flange section 48 of plug 42 substantially perpendicular to the edges of slit 43. The purpose of the biasing means 44 is to cause pressure to be exerted perpendicularly against the length of the slit 43 after the plug has been inserted into plunger tube 40. As shown in FIGS. 5 and 6, plunger tube 40 and the plug 42 are substantially round except for the extending projection 46 on plug 42. When the plug is inserted into the plunger tube, the projection is forced into the resilient plug resulting in a compressive force extending laterally across the plug perpendicular to the length of the slit 43, thereby pushing the edges of the slit together to form a tight seal. If, as shown in FIG. 7, a force is exerted from below such as the force from the serum 50 contained in the lower part of the outer tube 52 and the plunger tube is pressed down into the fluid or serum, the edges of the slit will separate, opening upwardly, permitting the fluid to pass up and into the plunger tube. When the downward movement of the plunger tube is halted, the lips of the slit will return to their former position and be pushed tightly together by the biasing means 44. In addition, when the plunger tube is withdrawn or moved upwardly, port valve 54 shown in both FIGS. 7 and 8 will automatically open (See FIG. 8) to permit the flow of air through the valve port 54 into the lower part of the collection tube thereby eliminating any suctional pressure effects which would otherwise develop below the plug if the port valve 54 were not present. The port valve operates quite differently from the slit valve, such that when the flange section of the plug is forced upwardly and inwardly by the edges of the flange frictionally engaging the inner wall of the outer tube, the orifice of the port valve 54 is compressed, thereby closing the opening. Conversely, and as shown in FIG. 8, when the plunger tube 40 is pulled upwardly the frictional force between the flange edge 56 of the plug 42 and the inner wall of the outer tube 52 forces the flange edges downwardly and inwardly thereby opening the orifice of the port valve 54 permitting air to flow downwardly into the lower portion of the outer tube below the plug assembly.

FIGS. 9, 10 and 11 illustrate alternate embodiments of the resilient piston-valve plug. More specifically, FIG. 9 illustrates a plug 60 having two projections 62a and 62b each being substantially perpendicular to the length of the slit 64 and in opposition to each other. FIG. 10 shows a plug 66 shaped in an oval manner. The longest diameter is substantially perpendicular to the slit 68, such that the same effect of compression is obtained when the plug is inserted into a round plunger tube.

The alternate embodiment shown in FIG. 11 is particularly interesting in that the biasing means is not an integral part of the plug 70 per se which is completely round. In this embodiment the compressional effect is gained by incorporating the biasing means in the plunger tube. FIG. 12 illustrates a plunger tube 72 having an indentation 74 perpendicularly oriented with respect to the length of the slit 76 of the plug 70 which serves as the biasing means.

The plunger tubes described above and shown in the drawings are round, but it is obvious that the cross-section of the plunger tube and even the plug need not be round. The important consideration is that the mutual shapes be such that a compressive force is established across the plug substantially perpendicular to the length or edges of the slit to provide one-way valving operations responsive to an axial pressure but which closes or seals tightly when the axial pressure is removed.

The efficiency of the slit valving system incorporated in the plug assembly is such that it has wide application in areas of fluid transfer, for example, in the passage of fluids along a conduit. The one-way valving system can be particularly useful, and if the application is such that the suctional effect described above is not present, then the one-way slit valve can be utilized without an outer port valve being provided in the flange section if a flange section is used.

A typical alternate use is shown in FIG. 13 wherein a fluid is shown flowing along tube 80. As long as this condition exists, the slit 82 of the plug 84 will remain open. If the flow is stopped, the slit edges will come together and seal tightly as a result of the biasing means 86 consisting, in this instance, as an indentation in tube 80. In this manner reverse flow is prevented.

In addition to the advantage of extremely tight sealing while permitting rapid opening in response to axial pressure, the present plug assembly is fairly economical and simple to produce, particularly since the slit can be molded simultaneously with the molding of the plug. Normally, the molding of the slit with the molding of the plug would present problems in sealing because the slit opening would generally be too wide. In such a situation, the plug would be molded and a razor-sharp instrument used to slit the plug. However, even this might not be sufficient and, as shown in U.S. Pat. No. 3,661,265, the opening is formed both axially and diagonally to create a flap effect. The need for a complicated structure is avoided in the present invention by the use of biasing means to create a compressive force to maintain the lips of the slit sealed when axial pressures are not present.

Filters can be used either above or below the one-way slit valve. As shown in FIG. 5, a cup-shaped piece of filter material 70 formed by either folding or molding into a cup-like shape is reversely inserted into the central opening 72 below the slit valve. If desired, a sheet of filter material can be placed over the top of the plug above the slit valve. In either position, a cement would not be required. If the filter is placed below the slit valve it would be held in place by the fluid pressure below the valve when the plunger is moved downward. On the other hand, when the plunger is moved upwardly, the valving system is sufficiently tight, such that it is not important that the filter stay in place. Normally, however, because of the operation of the flange valve in eliminating any suctional effect below the plug, the filter generally stays in place. When the filter is placed on top of the slit, it can readily be held in place by overlapping the filter material between the inner wall of the plunger tube and the plug. Consequently, almost any type of filter material can be used, such as paper, as long as it is inert to the fluids being filtered.

If the plug is constructed so that it is tight within the plunger tube, it will not loosen when the plunger tube is pulled upwardly. In addition, the construction of the biasing means contributes to securing the plug firmly in place during plunger tube movement. If high speed production of the plunger tubes or the plugs is such that basic tolerances will not be met, then a slight indentation in the plunger tube adjacent the plug will secure the plug in place. Obviously, other means might be used, such as ridges in the plug assembly or in the inner wall of the tube or even adhesives, since the fluid does not contact this area. However, if reasonable usage and molding practices are employed, adhesives should not be required.

While there has been shown and described a preferred embodiment of the present invention, it will be understood by those skilled in the art that various rearrangements and modifications may be made therein without departing from the spirit and scope of the invention.

I claim:

1. A separation unit comprising an outer tube with a lower closed end, a plunger tube longitudinally movable within said outer tube, a resilient piston-valve plug seated in the inner end of said plunger tube, said plug comprising a tubular body portion seated in the inner end of said plunger tube, an upper head portion having a slit therethrough for permitting the flow of liquid from the space in said outer tube below said piston-valve plug into the space in said plunger tube above said piston-valve plug and a lower annular flange portion with valve means comprising a port therethrough for permitting the flow of air from the space in said outer tube surrounding said plunger tube above said piston-valve plug into the space in said outer tube below said piston-valve plug when said plunger tube is moved outwardly of said outer tube.

2. The separation unit of claim 1 including a filter element seated in said plug to filter liquid prior to flow through said slit.

3. The separation unit of claim 1 wherein said plunger tube has an outwardly flared inner end.

4. The separation unit of claim 3 including a filter element seated in said tubular body portion of said piston-valve plug to filter liquid prior to flow through said slit.

5. The separation unit of claim 1, wherein the resilient piston-valve plug is associated with biasing means oriented substantially perpendicularly with respect to the edges of the slit thereby causing pressure to be exerted perpendicularly against the length of said slit.

6. The separation unit of claim 5 including a filter element seated in said plug to filter liquid prior to flow through said slit.

7. The separation unit of claim 5 wherein the one-way valve means is a port comprising an orifice which is constructed such that the orifice is compressed closing said orifice on the downward stroke of the plunger tube and opening as the plunger tube is withdrawn from the outer tube.

* * * * *